United States Patent [19]
Ide

[11] Patent Number: 5,281,033
[45] Date of Patent: Jan. 25, 1994

[54] HOUSED BEARING ASSEMBLY WITH SEALED ROLLER

[76] Inventor: Russell D. Ide, 122 Ridge Dr., Exeter, R.I. 02822

[21] Appl. No.: 962,344

[22] Filed: Oct. 16, 1992

Related U.S. Application Data

[63] Continuation-in-part of Ser. No. 756,053, Sep. 6, 1991, Pat. No. 5,156,443, which is a continuation-in-part of Ser. No. 593,956, Oct. 9, 1990, abandoned.

[51] Int. Cl.⁵ .................................................. F16C 17/00
[52] U.S. Cl. ..................................... 384/213; 384/130; 384/286; 384/397; 384/404
[58] Field of Search ............... 384/213, 206, 397, 404, 384/465, 473, 286, 130

[56] References Cited

U.S. PATENT DOCUMENTS

| | | |
|---|---|---|
| 2,884,284 | 4/1959 | Bohn .................................. 384/404 |
| 2,912,288 | 11/1959 | Griswold, Jr. |
| 2,960,370 | 11/1960 | Love et al. ......................... 384/213 |
| 3,185,531 | 5/1965 | Modrey . |
| 4,306,756 | 12/1981 | Whiting . |
| 4,359,945 | 11/1982 | Brems et al. ........................ 104/89 |
| 4,384,387 | 5/1983 | Pachuta ............................... 16/107 |
| 4,466,508 | 8/1984 | Buse .................................... 384/404 |
| 4,722,115 | 2/1988 | Yang .................................... 16/45 |
| 5,156,443 | 10/1992 | Ide ....................................... 384/58 |

Primary Examiner—Lenard A. Footland
Attorney, Agent, or Firm—Michael D. Bednarek

[57] ABSTRACT

A housed bearing assembly suitable for use as a pillow block bearing unit or flanged bearing unit. The assembly includes a shaft sleeve and roller body secured to one another and enclosed by a housing. The roller body is adapted to roll against an inner peripheral surface of the housing. A supply of lubricant sufficient to lubricate the roller body is contained within the housing. The housing and rolling body are designed to direct lubricant toward fluid tight areas of the assembly and away from those areas where leakage might occur. A lubricant containment reservoir is formed in either the housing or the shaft such that lubricant will not reach the space or interface between the shaft and the housing. The roller body may be provided with a drip edge to further direct lubricant away from the interface between the housing and the shaft. The housing is constructed as a spherical segment seated in a spherical seat to allow pivoting of the inner housing portion to pivot to adjust for misalignment.

7 Claims, 11 Drawing Sheets

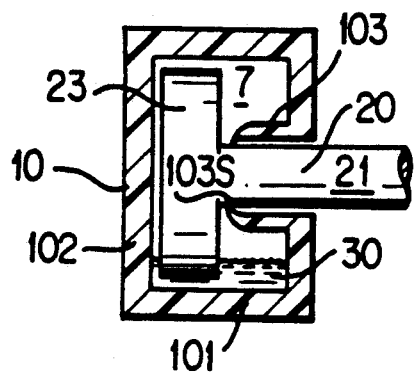
FIG. IA
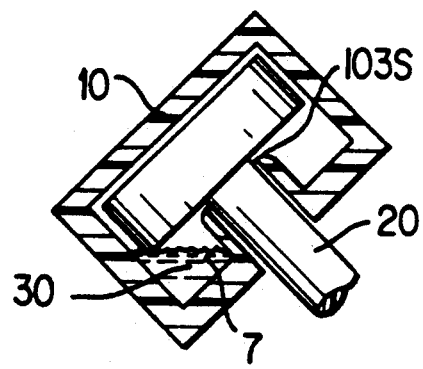
FIG. IB
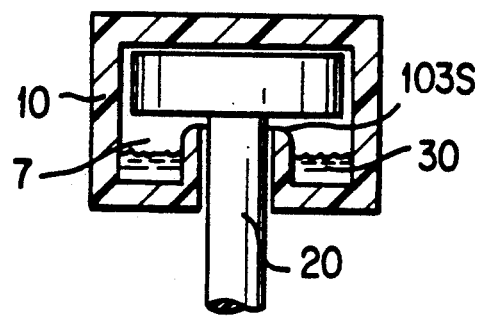
FIG. IC

FIG. 2
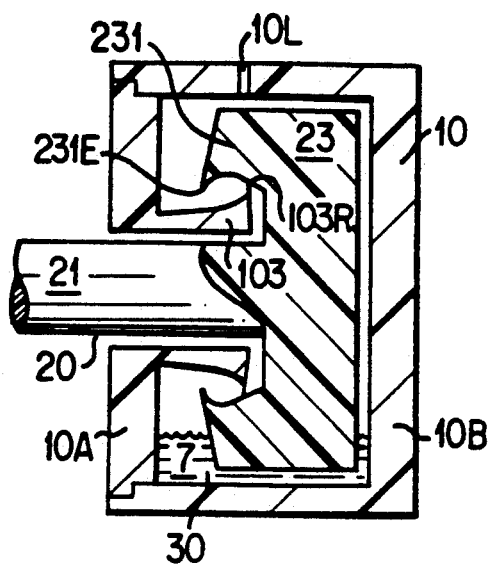
FIG. 3
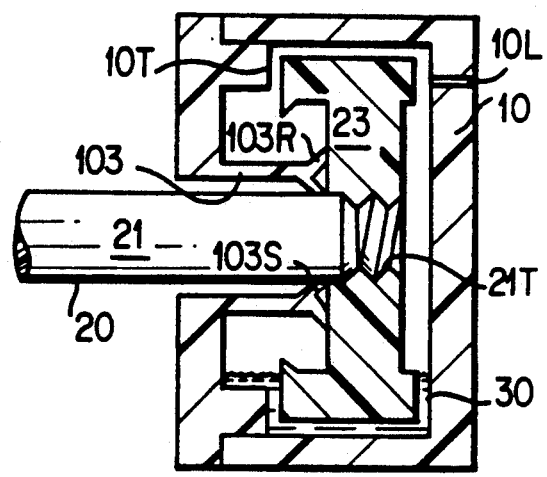
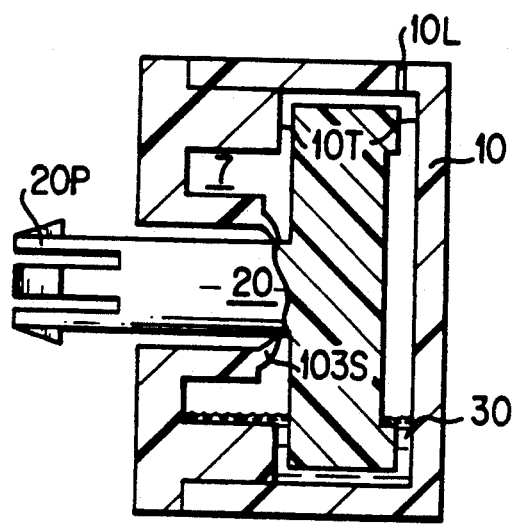
FIG. 4
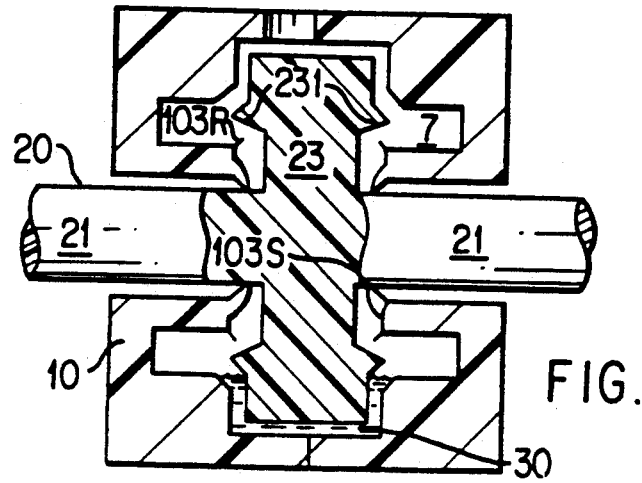
FIG. 5

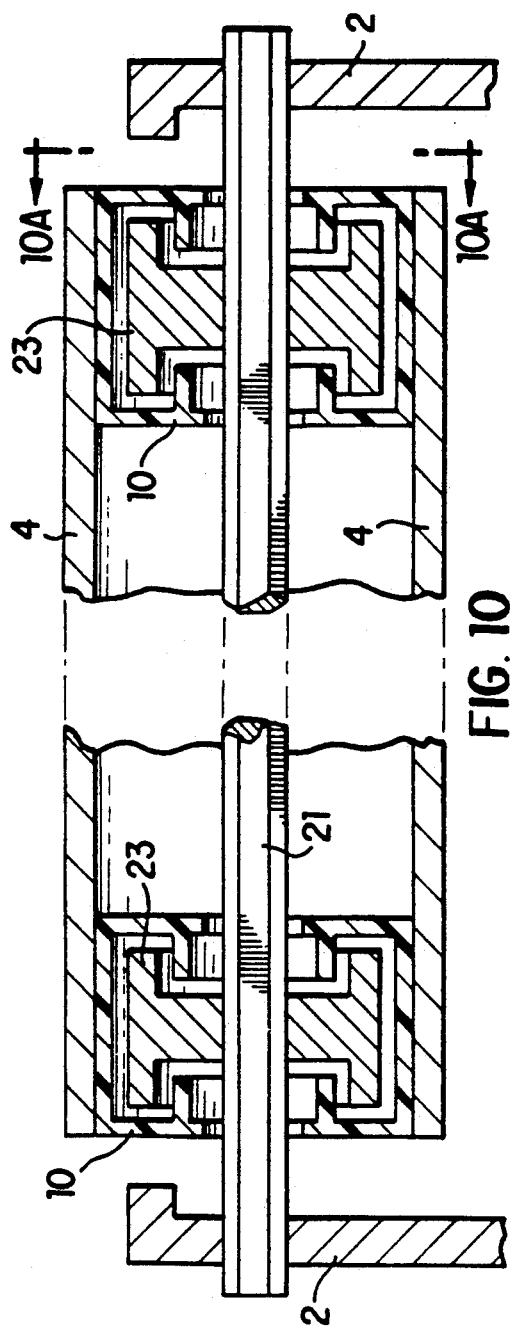
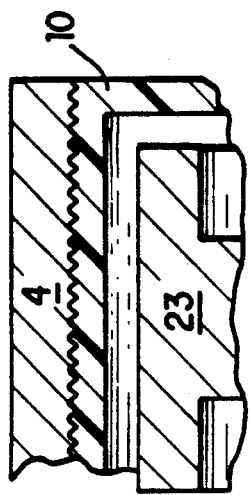
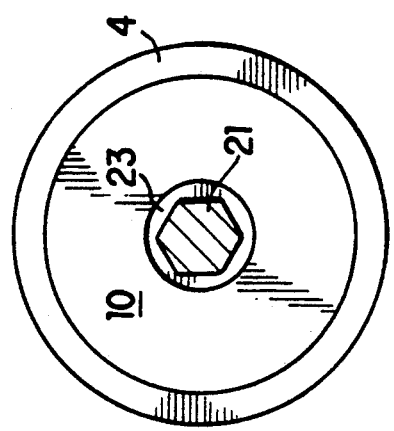
FIG. 10
FIG. 10B
FIG. 10A

HOUSED BEARING ASSEMBLY WITH SEALED ROLLER

This application is a continuation-in-part of and claims the benefit of 35 U.S.C. § 120 with respect to U.S. application Ser. No. 07/756,053 filed Sep. 6, 1991 entitled "Sealed Roller Assembly" now U.S. Pat. No. 5,156,443 which application is a continuation-in-part of U.S. application Ser. No. 07/593,956 entitled "Sealed Roller Assembly" which was filed on Oct. 9, 1990 and now abandoned.

FIELD OF THE INVENTION

The present invention relates to roller assemblies which include a, preferably cylindrical, housing rotatably supported on a shaft. The present invention is particularly directed to the adaptation of such roller assembly for use in a self-contained or housed bearing system such as a pillow block bearing unit or flanged unit both of which are referred to as pillow block assemblies hereinafter.

BACKGROUND OF THE INVENTION

Pillow block and flanged bearing units are basically self-contained bearing systems which include a housing for containing oil, a shaft sleeve adapted to be secured to a shaft, and a bearing. The two most common types of housed units, pillow block and flanged units, have similar features, but flanged units are mounted by bolts through a housing flange whereas pillow block units include a mounting base. Because of the similarities, both units are sometimes referred to pillow block units and that practice is followed to some extent hereinafter.

Housed units offer a number of advantages including ease of installation and mounting. Moreover, the housings can be mounted in any position and self-aligning and relubricatable designs are available. They provide an acceptable choice in many applications including: conveyor systems, fans and blowers, baggage lines, material handling, food packaging plants and textile machinery. Housed units are well suited for a variety of industrial applications from those involving normal or routine loads as well as adverse applications involving wet and dirty environments.

Typically, a self-contained housed unit of the pillow block or flanged type includes a base or housing, superfinished inner and outer rings, high grade ball bearings and precise ball bearing assembly. Although such units have proven adequate in the past, they are expensive and difficult and relatively difficult to assemble. Many of the problems associated with pillow block bearings are common to all rolling element bearing assemblies and are discussed below.

An alternative to rolling element bearing assemblies is the plain bearing assembly, but there are problems adapting such a unit to a pillow block or self-contained unit. Pillow block bearings are typically either grease or oil filled, with oil generally being preferred. To avoid leakage, however, the oil level must be kept below the shaft line, i.e., one third filled. This presents a problem when a sleeve bearing is used in the pillow block bearing assembly because it is difficult to distribute oil along the entire bearing surface.

The problem of insufficient lubrication is not unique to pillow block bearing arrangements. Indeed, the problem occurs in roller assemblies of the type which include at least two parts which are rotatable relative to one another and some form of bearing supporting the two parts on one another.

Roller assemblies are used in a wide variety of applications. Among the most common applications are those in which the roller assembly is used to provide a rolling path. In a typical rolling path or roller conveyor system, an appropriately spaced series of hundreds of more roller assemblies is used to provide a rolling path or track for goods during assembly, manufacture, or processing. Some such applications require miles of conveyor paths and millions of roller assemblies. Roller assemblies are also commonly used as a wheel. One example of a roller assembly used as a wheel supporting a load for movement is an overhead conveyor system wherein the load is hung from a bracket which is typically rollingly supported by two rollers on opposite ends of an I-beam. Roller assemblies are also used as wheels in carts, tilt trucks and the like.

In the past, the most common form of roller assembly has consisted of a metal shaft supporting a roller bearing which in turn supports a metal, plastic or rubber wheel. A number of problems have been experienced with this conventional roller assembly. Among other things, the conventional assembly wears too quickly, can seize up and break, is relatively expensive and can be quite noisy. These problems all result, at least partially, from the use of a roller bearing in the assembly. The roller bearing is easily the most expensive component of the system. Unless an extremely precise (and expensive) roller bearing is used, the bearing is likely to be noisy. Moreover, even the best roller bearings wear relatively quickly. Excessive wear of the metal can, of course, lead to failure. Also, in many assemblies the material that wears off is the zinc plating which protects the steel shaft from corrosion. The use of roller bearings also complicates the assembly of the roller assembly because it is necessary to secure the roller bearing to both the shaft and the housing member.

Another disadvantage associated with conventional roller bearing type roller assemblies is that the assemblies almost always include metal bearings lubricated with a grease or oil. The use of the metal and grease or oil presents problems in applications where the roller assembly is likely to be subjected to corrosive materials or in food processing facilities where a premium is placed on sanitation.

One attempt to overcome the disadvantages associated with roller bearing type rollers and provide an improved roller is the so called all-plastic roller. One known example uses a self-lubricating plastic such as nylon reinforced with an aramid fiber to increase the stiffness and load bearing capability of the plastic. The relatively movable shaft and housing are in direct contact with one another and no lubricant is provided.

Because of the use of high performance engineering plastics, it was expected that this all-plastic dry roller assembly would offer longer life and reduced maintenance compared to greased metal rollers. However, in practice a number of problems have arisen. For instance, the coefficient of friction in the dry system is too high; this results in excessive power requirements to drive the roller assembly. Finally, without lubricant, the plastic wears too quickly thus limiting the life of the roller assembly. Finally, the plastics have a limited load capability.

Heretofore, there has been a reluctance to attempt to use lubrication in an all-plastic roller assembly or in an assembly having an all plastic housing because of the difficulty of sealing the lubricant within the all-plastic assembly. It was thought that proper sealing would require a complex seal assembly thus increasing the cost of the overall roller assembly. Moreover, there has been no practical way to ensure the integrity of the seal as is required in certain applications such as food processing. In large part, the reluctance to use lubricant results from the recognition that it is extremely difficult, if at all possible, to seal between two relatively movable surfaces when the interface of the two relatively moving surfaces is acting as a fluid dam.

The significance of the above described problems with known roller assemblies can be appreciated when one considers that a large manufacturing or food processing facility can easily include millions of roller assemblies. If the roller assemblies wear too quickly, it becomes necessary to replace each of the millions of roller assemblies. This can cause manufacturing delays and is, of course, very expensive. Moreover, when a single application uses millions of roller assemblies, even a small decrease in the cost of each assembly can drastically reduce the overall cost of a conveyor system. Likewise, any reduction in the cost and time required to assemble individual rollers and conveyor systems using such rollers can be very significant. Further, any noise generated by each individual roller is greatly magnified when millions of roller are used in a single facility.

Thus, there remains a need for a roller assembly which is inexpensive, durable, leak proof, non-corrosive and quiet. Such as assembly, if possible, could be adapted to various applications including among others, plain bearing arrangements suitable for use in a pillow block bearing assembly.

SUMMARY OF THE INVENTION

The present invention relates to the adaptation of the inventor's previously disclosed sealed roller assembly to the field of plain bearings, and more specifically, to the field of self contained bearing units such as pillow block bearing units and flanged bearing units. A further aspect of the present invention relates to a system of containing and distributing oil in the pillow block by connecting the shaft to the outer, rotating member of a sealed roller assembly such that rotation of the outer member centrifugally distributes the oil. This eliminates the slinger ring and more evenly distributes oil to the thrust and radial surfaces.

Specifically, the housed bearing assembly of the present invention includes a shaft sleeve adapted to be secured to a rotating shaft for rotation therewith, a roller body secured to the shaft sleeve for rotation therewith and a housing. The roller body includes a cylindrical wall portion. The housing includes an outer housing portion and an inner housing portion. The outer housing portion has a radially innermost surface formed with a spherical seat. The inner housing has a radially outermost surface formed with a spherical segment which conforms to the spherical seat formed in the outer housing so that the inner housing is pivotably seated in the spherical seat formed in the outer housing. The inner housing also includes a cylindrical peripheral wall portion disposed adjacent to the cylindrical wall portion of the roller body such that the roller body contacts the wall portion at a contact surface such that the roller body may roll on the cylindrical peripheral wall portion of the housing. A predetermined supply of lubricant is contained within the housing and a lubricant containment reservoir is formed in the housing or the roller body. The lubricant containment reservoir is designed to contain lubricant such that lubricant is provided at the contact surface.

The cylindrical wall portion of the roller body may be located either radially outward or radially inward of the cylindrical peripheral wall portion of the housing. In one embodiment, the roller body is in the form of an annular trough with the cylindrical wall portion of the roller body comprising the base of the trough and radially inward extending walls comprising the side edges of the trough such that on rotation of the roller body, lubricant contained within the trough is certrifugally distributed across the cylindrical wall portion of the roller body. A seal may be provided on either the housing or the roller body to contact the other member so as to seal the interior of the housing at a sealing point. In such a case, the lubricant containment reservoir may be designed to contain lubricant such that regardless of the orientation of the assembly, lubricant does not collect at the sealing point.

An important aspect of the present invention is the design of the housing and rolling body such that lubricant is directed away from possible leakage points and into fluid tight troughs or containment reservoirs. This involves adaptation of some of the unique features of the roller assembly of the present invention to housed bearing units. The roller assembly can also be used to support a conveyor-type roller, or as a wheel for use in an overhead conveyor system or a cart or the like. The assembly is inexpensive, durable, quiet, non-corrosive and leak proof.

The roller assembly of the present invention includes at least one shaft, a roller body secured to the shaft and a housing surrounding the roller body and including an opening for receiving each of the one or more shafts. A predetermined amount of a lubricant, preferably a light oil (spindle oil, transmission fluid, etc.), is contained within the housing such that when the roller assembly is oriented in its normal position (with the shaft extending horizontally), the lubricant lubricates the roller body for rotation with the cylindrical interior of the housing. This lubrication reduces the coefficient of friction of the roller body relative to the housing from 0.1 to 0.04 or less (at least 2.5 times less friction) thus significantly reducing wear and extending life.

Since the roller assembly is maintained in the same horizontal configuration for the duration of its life, the housing can provide a complete seal for retaining the lubricant within the housing. The housing includes a contact seal formed integrally therewith along the periphery of each of the shaft receiving openings to inhibit fluid flow between the housing and the shaft. The contact seal also acts to prevent or limit the entry of dust and other contaminants into the sealed interior of the assembly. The housing further includes a containment reservoir designed to contain lubricant such that regardless of the orientation of the roller assembly, lubricant does not collect at the contact seal point.

The housing may include a cylindrical sleeve extending into the housing from the shaft receiving opening. The sleeve is spaced from and surrounds the shaft to define an annular containment reservoir surrounding the shaft and being located axially adjacent the roller body on the side of the roller body that is connected to the shaft. The contact seal is formed at the axial end of the sleeve opposite the shaft receiving opening. Thus, in the event the roller assembly is displaced from its normal orientation, the lubricant will be retained either within a closed axial end of the housing or within a containment reservoir at the open end of the housing or, in accordance with one embodiment, in a bore formed in the interior of the shaft itself. Thus, the bulk of the lubricant will never come in contact with the interface of the contact seal and the rolling body or shaft. The contact seal will only have to prevent leakage of the occasional drops which slide past the interface.

The seal may be a simple lip seal directly contacting the shaft or a progressive seal having portions contacting both the roller body and the shaft.

In accordance with another aspect of the present invention, the seal can be part of a shingle-type structure. The shingle-type structure is provided in conjunction with an embodiment wherein the roller body is provided with an annular axially extending protrusion such that any lubricant which clings to the periphery of the roller body and is carried up to the top of the roller assembly is deflected axially away from the roller body by the annular protrusion. The seal formed integrally with the housing includes a portion which extends radially outward and axially under the annular protrusion such that the lubricant directed away from the roller body flows into the containment reservoir and is prevented by the shingle structure, from coming into contact with the seal of the housing. When, as discussed below, the annular projection and the shingle are properly inclined there is virtually no chance that lubricant will come into contact with the interface of the housing and contact seal point. Further, if desired, the radially extending portion of the seal can be extended to contact the lower edge of the annular projection so as to eliminate the need for a separate housing to shaft contact seal.

As an alternative, the lubricant containment reservoir may be formed in the shaft rather than the housing. In such a case, the shaft would be formed with an axial bore and passages providing communication between the bore and the interior of the housing. The housing could be provided with a simple contact seal at the periphery of the shaft receiving opening to guide lubricant into the passages.

The assembly of the present invention may be formed as a modular unit for ready assembly into a variety of applications. For instance, the shaft may be formed either integrally or separate from the roller body. In a modular assembly, the shaft could be formed separately such that a complete module including the roller body, lubricant and housing could be used in connection with various shafts. Any known form of shaft-to-roller body connection could be used. For instance, the shaft could be threaded into the roller body to provide a detachable connection as might be desirable in, for example, an application in which the housing functions as a wheel. On the other hand, if, because of the durability of the roller assembly of the present invention, it is not anticipated that the shaft and roller body will have to become separated during the life of the roller assembly, the module could include a snap-type connection between the shaft and the roller body.

In another form of modular assembly, the shaft and roller body are formed integrally but the shaft is a stub type shaft adapted to be connected to another shaft or body member. The stub shaft end can be provided with any type of releasable or permanent connecting means. However, a snap type connection as suggested by the present invention appears to be particularly appropriate.

The roller assembly also may be constructed with shafts extending out of both axial ends of the assembly. This, might be desirable, for example, in a cart or track-type system utilizing a single wheel.

The roller assembly of the present invention has a wide variety of applications. Generally, the roller body 23 of the assembly should roll along the lower portion of the interior surface of the housing where lubricant 30 collects. In some applications, however, the centrifugal action of the rotating housing will distribute lubricant along the entire interior surface so that the roller body can contact the interior surface of the housing at any point. With this in mind, the roller assembly of the present invention is adaptable to both overhead and roller-type conveyors and is well suited for use as the wheels in an inexpensive low r.p.m. wheeled carts such as a hand cart, shopping cart or tilt-truck.

Alternatively, the roller body may be formed of a metal such as steel to improve durability and wear characteristics. The housing could also be formed of metal. At present, the most preferred construction includes a housing formed of an engineering plastic and a roller body formed of steel.

The roller assembly of the present invention can be constructed entirely of non-metallic, non-corrosive materials. Engineering plastic materials, preferably high performance plastic materials such as acetal with an additive such as TEFLON graphite, molybdenum disulfide sold by DUPONT TM under the name DELRIN TM and a light oil such as spindle oil transmission fluid and the like are ideal.

The housing is preferably formed by blow molding or injection molding two housing halves. If the roller body and shaft are formed of plastic they are also formed by blow molding or injection molding either integrally or separately as discussed above. The shaft and roller body members, if formed separately, are then joined and the roller body is placed within one of the housing members. The second housing member is then connected to the first housing member to form a complete enclosure. The lubricating oil is then injected into the enclosed housing either through a preformed lubehole or by inserting a cannula through the housing. After the appropriate amount of lubricating oil is inserted in the housing, the hole in the housing is filled to provide a sealed roller assembly.

BRIEF DESCRIPTION OF THE DRAWINGS

FIG. 1A is a schematic cross-sectional representation of a roller assembly according to the present invention in its normal orientation i.e., with the shaft extending horizontally;

FIG. 1B shows the roller assembly of FIG. 1A with the shaft tilted about 45° down;

FIG. 1C shows the roller assembly of FIG. 1A with the shaft tilted 90° down.

FIG. 2 is a cross-sectional view showing a first embodiment of the roller assembly of the present invention;

FIG. 3 is a cross-sectional view showing a second embodiment of the roller assembly of the present invention;

FIG. 4 is a cross-sectional view showing a third embodiment of the roller assembly of the present invention;

FIG. 5 is a cross-sectional view showing a fourth embodiment of the present invention, in which shafts extend from both axial ends of the roller assembly;

FIG. 10 shows another roller-type conveyor arrangement using the roller assembly of the present invention;

FIG. 10A is an end view along the lines indicated in FIG. 10;

FIG. 10B is a detail view showing a roller assembly having a serrated outer periphery;

DETAILED DESCRIPTION OF THE DRAWINGS

Figure 6:
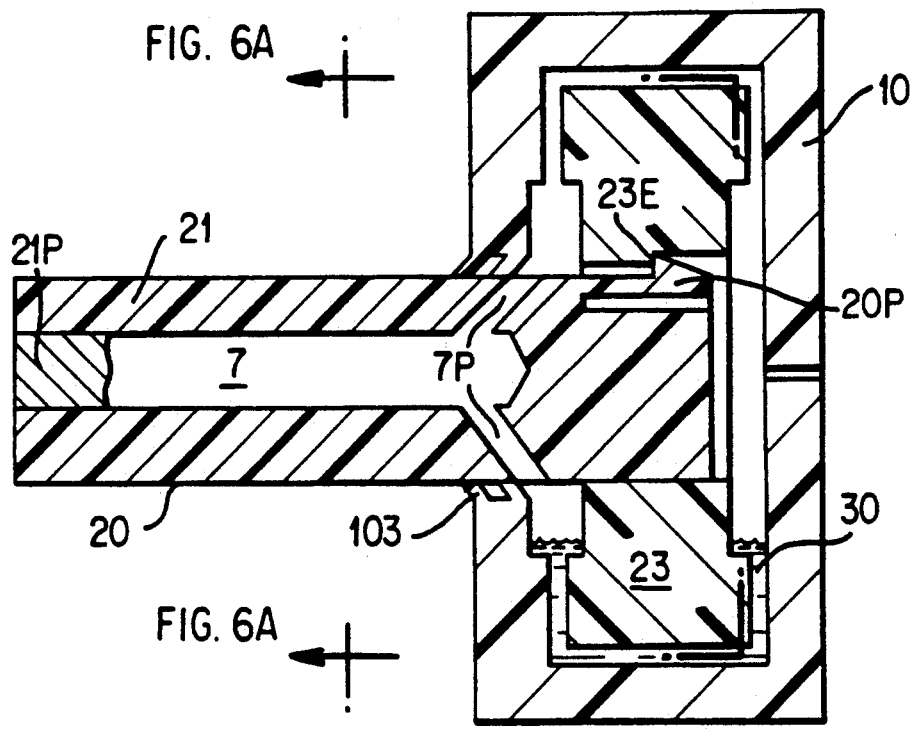
FIG. 6 is a cross-sectional view showing a fifth embodiment of the present invention in which the oil containment reservoir is formed in the shaft.

FIGS. 1A–1C illustrate the basic principle of the roller assembly of the present invention. The roller assembly includes a roller body and shaft assembly 20, a housing 10 and a predetermined amount of liquid lubricant 30. The roller body and shaft assembly includes a roller body 23 having a cylindrical outer periphery and a cylindrical shaft portion 21 coaxial with the roller body 23 and extending from at least one axial end thereof. The housing 10 has a generally cylindrical exterior shape (unless the exterior is provided with threads, splines, serrations, locking or snap projections, spring mounted projections or treads to accommodate a specific use, as discussed below) including a cylindrical outer peripheral wall 101 and two circular axial end walls 102. The outer peripheral wall 101 has a cylindrical interior surface on which the roller body 23 rolls.

The present invention relates to the adaptation of a sealed roller assembly for use as a self-contained bearing assembly of the type commonly referred to as a pillow block bearing unit or flanged bearing unit. The detailed description of the present invention will begin with a detailed explanation of the sealed roller construction which serves as one of the starting points of the present invention. Next, conventional pillow block flanged units, which are the other starting point of the present invention will be described. Finally, various embodiments of the self contained bearing unit of the present invention will be described. The shaft portion 21 of the roller body and shaft assembly 20 extends through at least one of the axial end walls 102.

In the example illustrated, the housing 10 is formed with a radially inner sleeve 103 extending axially from the end wall 102 toward the roller body 23 and spaced from and surrounding shaft portion 21. The axial end of the sleeve 103 closest to the roller body 23 is formed as a contact seal to provide sealing contact between a housing 10 and the shaft portion 21. This sealing contact inhibits entry of dust and other contaminants into the assembly and inhibits lubricant flow out of the assembly. The sleeve 103 defines the radially inner boundary of an annular lubricant containment reservoir 7 defined by the outer periphery of the sleeve 103, an axial end wall 102 and a portion of the inner surface of the outer peripheral wall 101. The sleeve is not necessary if the containment reservoir is formed in the shaft portion 21, as discussed below. A supply of lubricant 30 is located within the housing 10. The lubricant is preferably a light oil such as spindle oil or transmission fluid.

In FIG. 1A and all the other figures of drawings, the roller assembly is depicted with a space between the lower edge of the roller body 23 and the inner surface of the peripheral wall 101 against which the roller body rolls. The size of this space is greatly exaggerated to clearly illustrate the presence of lubricant at the contact point. In reality, the lubricant film at the lowest most point of the roller assembly is very thin; in effect, the roller body 23 slides on the inner surface of the wall 101 of the housing 10.

In some of the applications for which the roller assembly of the present invention is intended, the roller assembly will generally have a constant or stable horizontal orientation. FIG. 1A depicts the roller assembly in its normal orientation—with the shaft portion extending horizontally, i.e., parallel to the plane tangent to the earth's surface at an observer's position. The roller assembly will be horizontally oriented regardless of whether the roller assembly is used in a roller conveyor, as the guide wheels in an overhead conveyor or as the wheels on a cart. It can be readily appreciated from FIG. 1A that in this, normal position, there is little if any chance that lubricant 30 will escape the housing 10. Even if a small amount of lubricant 30 is dragged to the top of the housing by the rolling body 23, it will fall back into the bottom of the housing without escaping from the interior of the housing because of the contact seal 103S at the axial end of the sleeve 103. Thus, so long as the roller assembly is maintained in its normal horizontal orientation, i.e., the orientation shown in FIG. 1A, there is little chance that lubricant will escape from the interior of the housing.

Although the roller assembly of the present invention is intended for applications in which the orientation of the roller assembly is stable there will be times when the roller assembly is displaced from the orientation indicated in FIG. 1A. For instance, during transport and assembly and occasionally in certain uses (as in carts), the roller assembly will be disturbed from its normal orientation. Thus, in order to insure that the roller assembly is useful in a wide variety of applications, the roller assembly must also be fluid-tight when the assembly is not in its normal position.

With reference to FIG. 1A, if the roller assembly is tipped onto the axial end 102 opposite the shaft 21, there is no possibility of leakage since that axial wall 102 and the peripheral wall 101 form a fluid-tight container. However, at the other axial end where the shaft 21 extends through the axial wall 102 at the inner edge of the sleeve 103 it would be difficult, if not impossible, with the simple integrally formed seal at the end of sleeve 103 to ensure that fluid would not leak between the seal 103S and the shaft 21. This is because it is extremely difficult, if at all possible, to provide a perfect seal between two relatively moving surfaces with a simple contact seal when a supply of lubricant collects at the interface of the seal and the surface moving relative to it. In accordance with the present invention, however, the provision of the lubricant containment reservoir 7 ensures that lubricant will not collect at the seal interface and that the bulk of the lubricant 30 will never come into contact with the sealing edge 103S of the sleeve 103 and the shaft portion 21. Thus, it is only necessary to seal against drops which momentarily contact the interface on rare occasions; a contact seal is believed adequate for this purpose.

More specifically, with reference to FIGS. 1B and 1C, as the roller assembly is tipped down onto the end through which the shaft portion 21 passes, the lubricant 30 is retained within the containment reservoir 7 and never even approaches the sealing point 103S. Thus, the roller assembly is designed such that the bulk of the lubricant 30 is never in the vicinity of the region in which lubricant might escape, i.e., the interface between the sealing point 103S of the housing 10 and the shaft portion 21 which extends into the housing 10.

By virtue of this construction, lubricant can be provided to greatly reduce the coefficient of friction between the rolling body 23 and the peripheral wall 101. Specifically, the presence of lubricant reduces the frictional coefficient by at least a factor of 2.5 (from about 0.1 to below 0.04 in one example). This, of course, significantly reduces wear thus extending the life of the roller assembly. The presence of lubricant also reduces the noise generated by the roller.

The basic principle discussed above and illustrated by FIGS. 1A-1C can be extended to numerous specific applications using various forms of the general assembly. To illustrate various features which can be incorporated in actual embodiments of the basic roller assembly, these features are discussed hereinafter with reference to several specific embodiments. Generally, the specific features discussed herein with respect to one illustrative embodiment are easily combinable with other features described with reference to other embodiments. Thus, the housing and roller body shape of FIG. 2 can be used with a separate shaft and roller body construction as illustrated in FIG. 3 and/or with a stub-shaft assembly shown in FIG. 4 or a dual shaft arrangement as shown in FIG. 5. Also, as mentioned earlier, in each illustration the space between the roller body 23 and the interior of the housing 10 is greatly exaggerated. In reality, the space is quite small in that the roller body 23 slides on the interior of the housing on a thin film of lubricant.

FIG. 2 is a cross-sectional side view of a roller assembly according to the present invention. As shown, the roller assembly includes a housing 10, a shaft and roller body assembly 20 which includes a roller body 23 which slides inside the housing 10 and a shaft portion 21 extending out of the housing 10. Although shown as integral, the shaft 21 and roller body 23 could be formed separately, as discussed below. A supply of lubricant 30 is provided within the housing 10 to lubricate the roller body 23 as it slides within the housing 10. It should be noted that the term "slides" is used herein to describe relative motion between the housing 10 and the roller body 23. In certain cases, it is the housing 10 which actually turns while the roller body 23 remains substantially stationary; this is the case when the roller assembly is used as a wheel and when the housing supports a rotatable member such as in certain conveyor systems.

Figure 7:
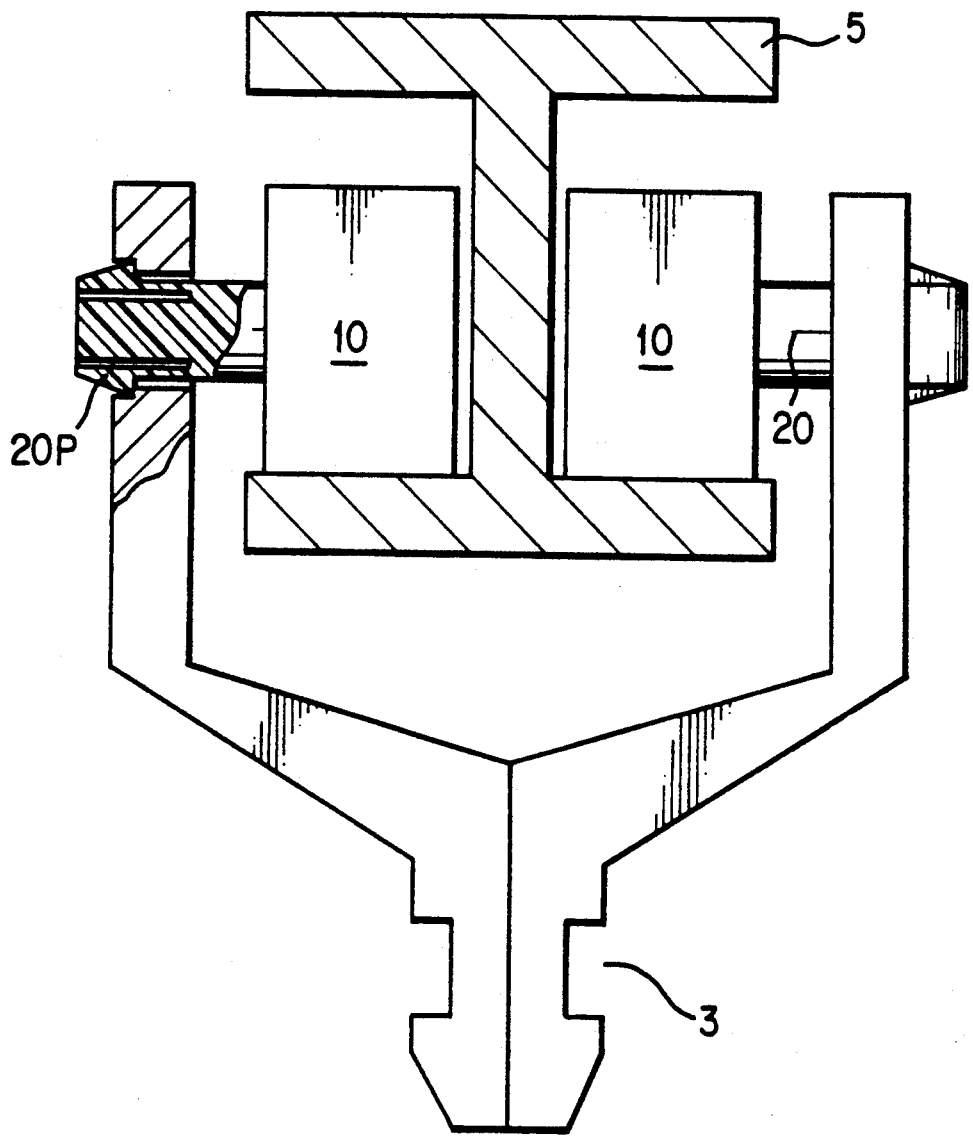
FIG. 7 illustrates the use of a roller assembly according to the present invention in an overhead I-beam conveyor system.

The housing 10 includes an axially extending sleeve 103. The sleeve 103 surrounds and is spaced from the shaft portion 21 at its inner radial edge and is spaced from the inner surface of the outer peripheral housing wall at its outer surface to define a containment reservoir 7 in the manner discussed above. In this embodiment, the roller body 23 further includes a tapered annular protrusion 231 which tapers to a radially inner point or drip edge 231E. The axial sleeve 103 includes a radially outward extending edge 103R which, in the assembled state shown in FIG. 2, contacts an edge of the annular protrusion 231. By virtue of this construction and the inclined shape of the roller body 23 and sleeve 103 as shown in FIG. 2, any small amount of lubricant which is dragged by the roller body to the upper portion of the housing 10 is directed by the taper of the annular protrusion 231 axially into the containment reservoir 7 and back to the bottom of the housing as shown in FIG. 7. Also, because the drip edge 231E overhangs the radial extension 103R and because of the downward slope of the sleeve 103, there is no possibility for lubricant to flow to the interface between the sleeve 103 and the roller body 23. Finally, because of the contact between the radial extension 103R of the sleeve 103 and the protrusion 231 of the roller body 23, a contact seal is provided between the housing 10 and the shaft and roller body member assembly 20 such that in the unlikely event (such as by vigorously shaking the roller assembly), that lubricant were to reach the interface of the radial extension 103R and the annular protrusion 231, the lubricant would be prevented from leaving the housing 10. The contact seal also inhibits the entry of dust and other contaminants into the assembly.

As shown in FIG. 2, the housing 10 is normally split to enable easy molding of the housing per se and to simplify assembly of the roller assembly. In the case of the assembly shown in FIG. 2, the housing 10 is split into separate portions 10A and 10B each of which is easily moldable, i.e., can be molded in a simple mold without the need for displaceable cams or the like. If desired, the pieces could also be blow molded. In the case of a split housing, the housing portions 10A and 10B are joined together by any known means such as, for example, sonic welding or an adhesive, such that once joined together, the separate formation of these parts does not affect the fluid tightness of the housing. Some form of split housing construction is preferably employed in each of the roller assemblies described herein.

FIG. 3 illustrates another roller assembly according to the present invention. In this embodiment, the shaft portion 21 is formed separate from the roller body 23 and the two are joined by a connecting means comprising complementary connectors formed on the two members to be joined. In the illustrated embodiment, the connecting means includes a thread 21T formed on the shaft and a complementary thread in the roller body; the shaft portion 21 can then be threaded into the roller body 23. Without more, this would provide a releasable connection between the shaft portion 21 and the roller member 23. The connection could be made non-releasable through the provision of an adhesive or some form of thread which prevents the shaft from being threaded out of the roller body 23 after initial assembly. Naturally, any suitable form of connector could be used. For instance, the snap-type connector shown in FIGS. 4, 6 and 6A could be used. Other types of connectors such as keylock or rivet type connectors could also be used.

The roller member 23 of the embodiment of FIG. 3 also includes an annular protrusion 231 which includes a drip edge 231E. However, this roller body member 23 does not include the gradually tapered surface of the previously described embodiment. The axial sleeve 103 of the embodiment of FIG. 3 includes both a radially extending portion 103R and a sealing lip 103S integrally molded with the axial sleeve 103. As with the previously described embodiment, the drip edge 231E of the annular protrusion 231 overhangs the radially extending portion 103R to provide a shingling effect which eliminates the possibility of lubricant flowing to the interface of the housing 10 and the shaft and roller body assembly 20.

In the embodiment of FIG. 3, the housing also includes a radially inward extending thrust face 10T adapted to contact a side edge of the roller body 23 for the purpose of supporting thrust forces. The opposite axial edge of the roller body 23 includes an annular lip which can contact the inner side of the axial end of the housing 10 to provide similar thrust support. Again, both the radial and axial space between the housing 10 and the roller body 23 are greatly exaggerated for purposes of illustration. In reality, the roller body 23 is separated from the housing only by a thin film of lubricant at the lower most peripheral edge of the housing 10 and at least one of the axial edges of the housing 10.

The releasable connection between the shaft portion 21 and roller member 23, as shown in FIG. 3, is only useful in applications in which either the housing 10 or the shaft portion 21 (or some member connected to it) would wear more quickly than the other portion. This could be the case if the housing 10 functions as a wheel for a cart or tilt-truck. In such cases it might be desirable to be able to remove the housing or wheel and replace it without discarding the entire shaft assembly. However, under normal circumstances, it is expected that the roller assembly will have an extremely long life such that it would generally not be necessary to provide a releasable connection.

FIG. 4 illustrates another roller assembly according to the present invention. In this embodiment, the shaft portion 21 and roller member 23 are shown as formed integrally. However, unless the housing is formed in several portions, the shaft portion 21 and roller member 23 would generally be formed separately, as discussed herein, to simplify assembly. The shaft portion 21 is, in effect, a stub shaft which extends just slightly out of the housing 10 and is formed with a snap connector 20P which allows the stub shaft 21 to be rotatably secured to any other shaft or a fixed support having a complementary connector formed therein. Although, a simple snap-type connector is shown, any known connection such as threads as shown above, could be employed. As shown, the housing 10 includes a thrust face such that the roller body 23 can contact either axial end of the housing for support of thrust forces. The axial sleeve 103 includes a simple lip seal 103S. Naturally, a more elaborate seal such as a progressive seal or a shingle type overhanging construction could be employed, if desired.

The roller assembly of FIG. 4 also illustrates the possibility of a modular type unit which can be simply snapped into place for various applications. For instance, if the roller assembly were to be used to support the rolls of a roll-type conveyor, the rolls could be simply snapped onto the ends of the stub shaft 21 and the housing 10 could be fixed to a support. On the other hand, if the roller assembly were to be used in an overhead I-beam type conveyor, the stub shaft 21 could be fixed to the mounting bracket and the housing 10 could be allowed to roll along the I-beam. If the roller assembly were to be used in a cart or tilt-truck, the stub shaft 21 could be simply inserted into the axle or body of the cart or truck and the roller housing 10 could function as a wheel. Thus, it can be seen that such a roller assembly offers numerous possible uses.

FIG. 5 illustrates another embodiment of the present invention. This embodiment is generally similar to the embodiment shown in FIG. 3 except that the elements have slightly different shapes and a shaft 21 extends from both axial ends of the housing 10. As can be appreciated with reference to FIG. 5, the provision of shafts extending from each axial end of the assembly does not hinder the lubricant retaining effect of the assembly so long as a lubricant containment reservoir 7 is provided at each axial end of the housing 10. A double shaft assembly of the type shown in FIG. 5 could be used as a single wheel in a cart or truck or as an intermediate support for roll type conveyors at each end of the housing 10.

FIG. 6 shows an embodiment of the present invention in which the lubricant containment reservoir 7 is formed in the shaft portion 21 of the shaft and roller assembly 20. In the illustrated embodiment, the reservoir 7 is formed as a central bore in the shaft portion 21. A plurality of circumferentially spaced ports 7P provide fluid communication between the interior of the housing 10 and the reservoir 7. As shown in FIG. 6, the supports can be angled to cause the flow of fluid into the reservoir when the roller assembly is displaced from its normal position and to cause lubricant to flow out of the reservoir 7 when the roller assembly is in its normal position as shown in FIG. 6. A seal such as a progressive seal or lip seal integrally formed with the housing 10 is arranged just axially outward of the ports 7P such that any fluid approaching the interface of the shaft 21 in the housing 10 flows into the port 7P rather than against the seal 103 and out of the housing 10. This embodiment also includes thrust faces at each end of the housing and the roller body 23 so that thrust forces can be absorbed.

The shaft portion 21 and roller member 23 may be formed integrally. However, in the illustrated embodiment, the members are formed separately and connected to one another by a non-releasable snap-type connection according to the present invention. The snap connection includes locking pawls 20P formed at one end of the shaft 21. The pawls 20P are sufficiently flexible in the radial direction to allow their insertion into grooves 23G formed in the inner periphery of the roller member 23. The roller member 23 is further formed with a locking edge 23E such that when the pawl slides in the groove 23G past the edge 23E, it snaps into place non-releasably and rotatably securing the roller body 23 to the shaft portion 21.

Figure 6A:
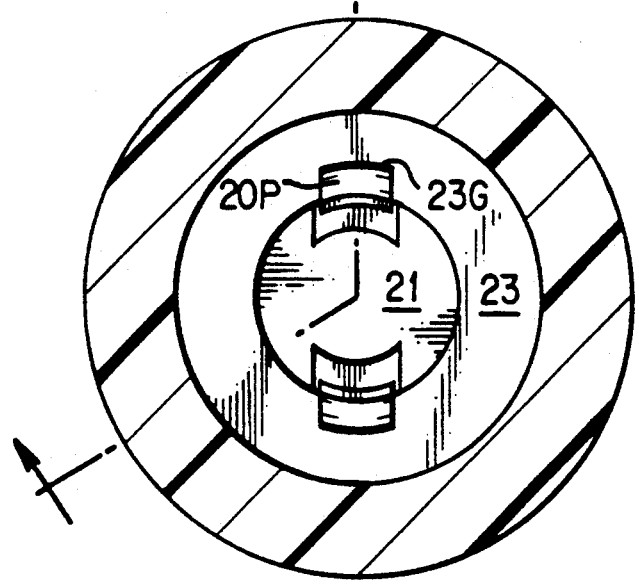
FIG. 6A is a cross-sectional detail view along the lines indicated in FIG. 6.

As shown in FIG. 6A, the locking assembly of the illustrated embodiment includes two locking pawls to insure a tight connection between the members. Naturally, variations of the snap-type connection can be employed. Moreover, the snap type connection can also be used in any of the other embodiments disclosed herein, if desired.

There are, of course, many ways to form the central bore defining the containment reservoir 7 in the shaft portion 21. In the illustrated embodiment, because one axial end of the shaft portion 21 functions as part of the snap connection, the containment reservoir 7 is formed by providing a longitudinal bore in the opposite end of the shaft portion 21 and plugging an axial end of the bore with a plug 21P (preferably of some type of plastic) so as to define a chamber. As indicated above, the ports 7P are provided or formed so as to allow fluid communication between the exterior of the shaft portion 21 and the interior of the chamber or reservoir 7.

FIGS. 7-10 illustrate several applications for the roller assembly of the present invention. Because of the construction of the roller assembly of the present invention, as described above, it is preferable that when used in any application, the shaft 21 and the roller body 23 connected thereto contact the lower end of the interior of the housing 10 where lubricant collects to insure proper rolling.

In the embodiment of FIG. 7, a roller assembly according to the present invention is used in a overhead conveyor in which two rollers are connected to each of a plurality of brackets 3 (only one of which is shown) to allow the brackets to roll along an I-beam 5 via the roller assemblies of the present invention. In the illustrated embodiment, the roller assemblies are formed with a stub shaft portion 21 which is simply snapped into the bracket 3 as shown in FIG. 7. Naturally, other forms of connection are possible.

Figure 8:
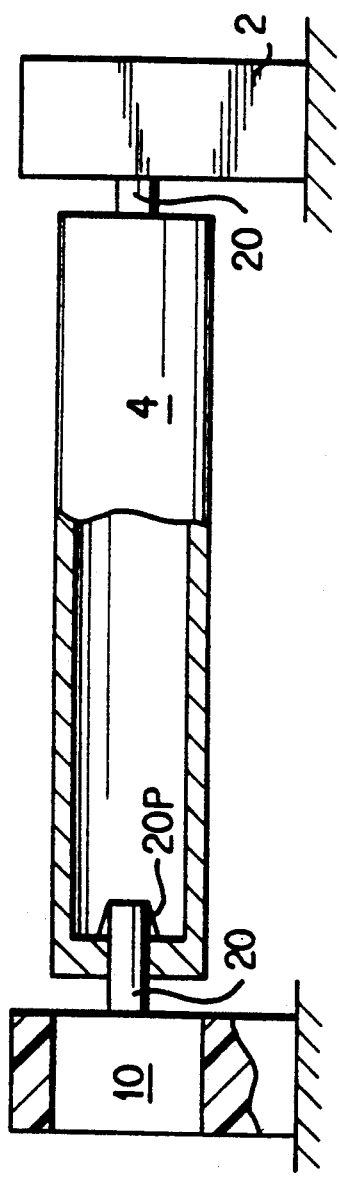
FIG. 8 shows a roller assembly according to the present invention used in a roller-type conveyor arrangement.

FIG. 8 shows an example of the roller assemblies of the present invention used to support a roll-type conveyor roll 4 rotatably. In this case, the roll 4 is secured to the shaft portions 21 of two roller assemblies and the housing portions 10 of the two roller assemblies are non-rotatably supported in a fixed support 2.

Figure 9:
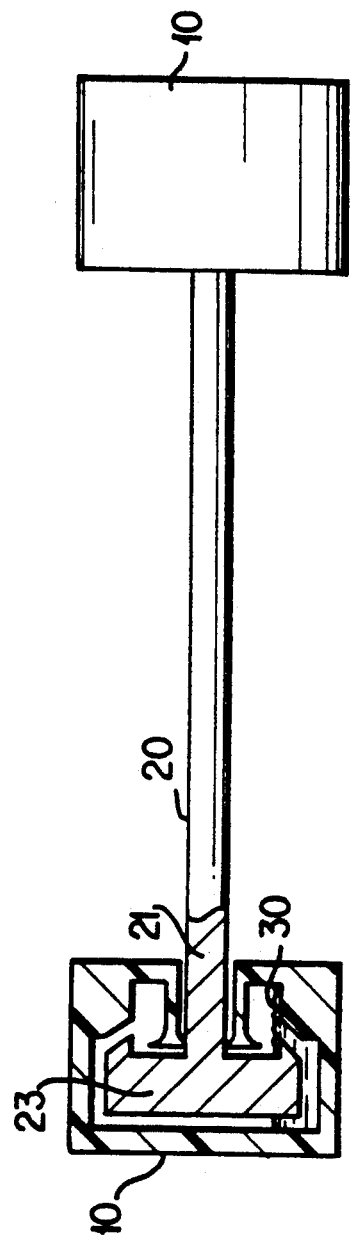
FIG. 9 shows a roller assembly of the present invention used as the axle and wheels for a simple cart or tilt-truck.

FIG. 9 illustrates an embodiment in which two of the roller assemblies of the present invention are connected to one another by single shaft which, in effect, functions as an axle with the housings of the roller assemblies 10 functioning as tires. In such an application, the housing 10 would be formed of or otherwise provided with an outer periphery of a suitable tire type rubber or plastic. As shown in the cutaway of FIG. 9, the roller assembly per se includes a shingle-type construction and a lip seal to avoid any possibility of leakage.

FIG. 10 shows an alternative way of using the roller assemblies of the present invention to support a roll-type conveyor roll 4. In this example, the roll 4 is in the form of a hollow tube. A roller assembly is fit into the opposite ends of the hollow tube as shown in FIG. 10.

In FIG. 10, the roller assemblies are press fit into the ends of the roll or tube 4. The roller assemblies can, however, be secured within the ends of the roll 4 in any known releasible or non-releasible manner including, but not limited to, adhesives, splines, snap-fit, spring-fit, threads, or, as shown in FIG. 10B, serrations. In the specific example shown in FIG. 10B, the roll is formed with serrations at its end such that when the housing portion 10 of the roller assembly is pressed into the end of the roll 4, the serrations tightly grip the outer periphery of the housing portion 10 to secure the roller assembly in the end of the roll 4.

The embodiment of FIG. 10 differs from the embodiment of FIG. 8 in that the housing portion 10 of the roller assembly is directly secured to the rotatable roll 4. Thus, in operation, it is the housing portion 10, not the roller body 23, which rotates with the roll 4. In this embodiment, the roller body and shaft 23, 21 are stationary. To ensure that the roller body 23 and shaft 21 remain stationary, the shaft 21 can be in the form of a hex bar as best shown in the end view of FIG. 10A. The hex bar or shaft 21 is received in a complimentary opening formed in the rails or end supports 2 so that the hex bar or shaft 21 is rigidly secured to the rail. The hex bar 21 extends through a complimentary opening formed in the roller member 23 so that the roller body 23 is rotatably fixed.

The roller body 23 is shown spaced from the inner surface of the housing member 10 for clarity in the drawings. In operation, of course, the housing portion 10 and roller body 23 slide relative to one another. In the specific embodiment shown in FIG. 10, it is the housing portion 10 which moves while the roller body 23 is stationary.

In an embodiment such as that shown in FIG. 10, the housing portion 10 and the roller body 23 contact one another at the top of the roller assembly. This is because gravity pulls the roll 4 and housing portion 10 down onto the roller body 23. Assemblies such as this where contact occurs at the upper end of the roller assembly can experience problems since the lubricant is drawn to the lower portion of the roller assembly by gravity. However, tests have shown that, in this specific application, the rotating plastic housing 10 flings the oil out centrifugally to effect lubrication. This centrifugal effect is primarily achieved because it is the outer housing portion 10 which rotates rather than the roller body member 23. If it was the roller body that was rotating instead, there may not be adequate lubrication.

In this specific construction, it has been found that the best results are achieved when the hex bar or shaft 21 and roller body 23 are formed of a metal such as steel. The roller body 23 may also be formed of plastic or less expensive metal with an outer sleeve of high performance bearing material as in the embodiment of FIG. 12 below. The housing 10 should be formed of a plastic material such DELRIN. The roll for the conveyor may be formed of either metal or plastic as suitable for the intended application.

The assembly shown in FIG. 10 is constructed by first inserting the roller assembly, without the hex bar 21, into the respective ends of the conveyor roll 4. The roll 4 is then aligned with the openings in the rails or supports 2 and the hex bar 21 is inserted through the openings in the rails and in the roller bodies 23 of conveyor roll 4 so as to support the roll 4 on the rails 2.

There are, of course, many types of housing constructions which can be used to facilitate attachment of the housing to a stationary support or, as in the case of the conveyor system of FIG. 10, to a rotating roll. For example, the housing portions could be glued or rigidly secured to the support by a bolt or the like. Some of the convenience of the present invention is lost, however, when additional structures such as bolts or pins or glue are used to secure the housing to a roll or a stationary support. As noted previously, the roller assemblies of the present invention can be used in constructions which require literally hundreds of thousands of such rolls. The assembly expense is dramatically increased if each such roll must be glued or pinned in place. Thus, it is better to have a roller assembly which can be fit into place without the use of additional means.

Figure 11:
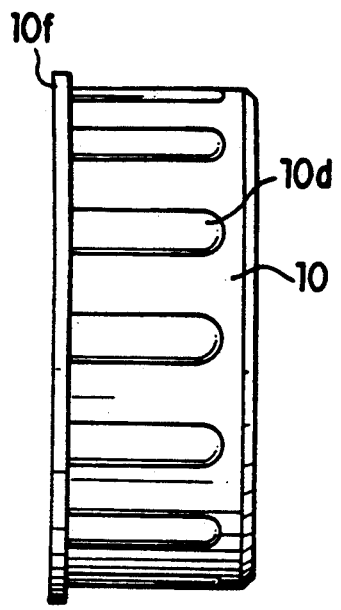
FIG. 11 is a side view of an alternative housing construction having a different type of serrated outer periphery.
Figure 11A:
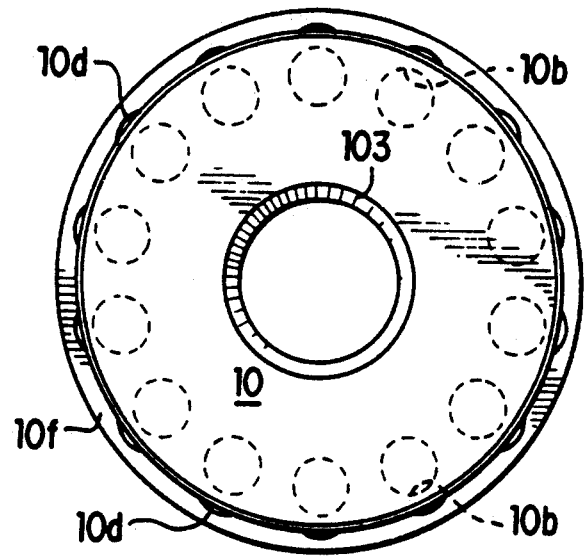
FIG. 11A is an end view of the housing of FIG. 11.
Figure 11B:
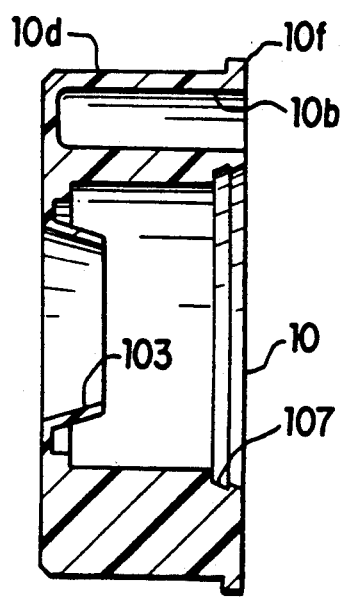
FIG. 11B is a cross-section of the housing of FIG. 11B.
Figure 11C:
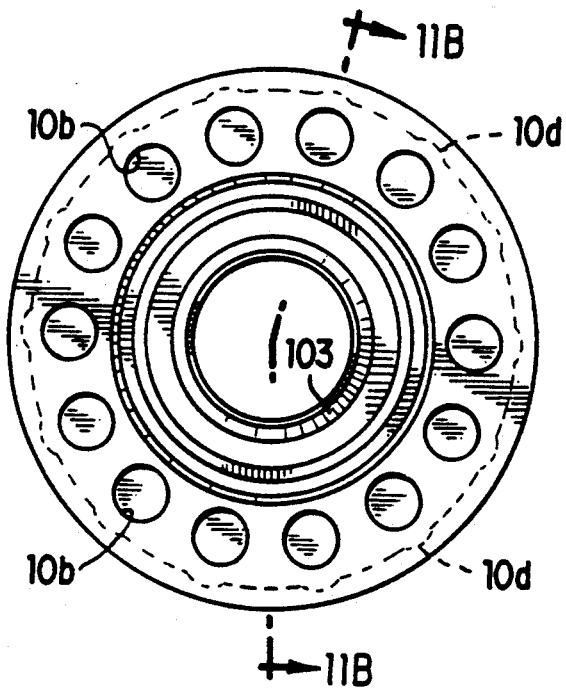
FIG. 11C is another end view of the housing of FIG. 11.

The serrated outer periphery of the housing 10 of the roller assembly shown in FIG. 10B is a simple example of a built-in attachment means. A more sophisticated housing construction is shown in FIGS. 11-11C. As shown in these drawings, the outer periphery of the housing 10 is formed with a circumferentially spaced series of elongated dimples 10d and with an end flange 10f. The end flange 10f is provided such that when the housing is assembled into the end of a roll such as the roll 4 shown in FIG. 10, the housing is maintained at the end of the roll and cannot slide further into the roll. Naturally, an end flange should not be used if it would interfere with inserting the housing into the stationary support as, for instance, if the roller assembly is to be inserted past the edge of the stationary support. In some cases, however, the end flange might be useful in positioning the housing accurately at the edge of the stationary support.

Except for the portion of the housing from which the flange extends, the dimples 10d define the outermost extent of the housing. As best shown in FIGS. 11A, 11B and 11C, the housing 10 is also formed with a series of circumferentially spaced bores 10b which are spaced so as to undercut each of the elongated dimples 10d. By virtue of this arrangement, each of the elongated dimples 10d is flexibly supported on the remainder of the housing such that the dimples 10d can be pressed radially inward. This makes it possible to press fit the housing assembly into a bore having a diameter which is slightly less than the diameter of the housing taken from the outermost extent of the dimples. Once assembled into the bore, the plastic housing 10 tends to bend radially outward to securely hold the housing in place.

The construction shown in FIGS. 11A, 11B and 11C has proven to be easy to assemble into a stationary support or tube or roll of the type shown in FIG. 10. Consequently, it is believed that this type of housing construction is particularly appropriate for high volume applications where many roll assemblies must be assembled into place.

As best shown in FIG. 11B, the housing can have an open end with locking projections 107 adapted to receive an end cover (not shown). The end cover can be a simple cover to seal the housing. Alternatively, the end cover can have a shaft receiving opening and lubricant retaining reservoir similar to the opposite end of the housing such that the shaft can extend through each end of the housing.

Figure 12B:
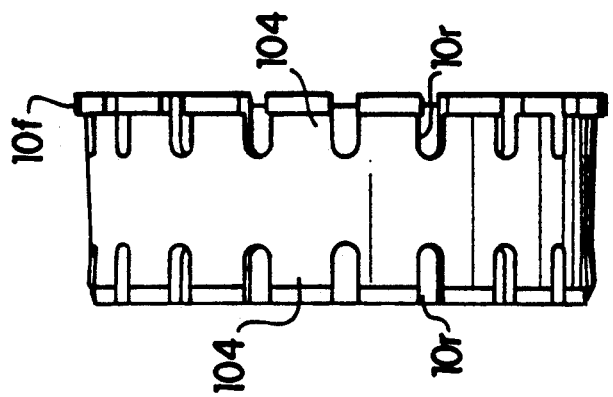
FIG. 12B is a side view of the roller assembly of FIG. 12.
Figure 12A:
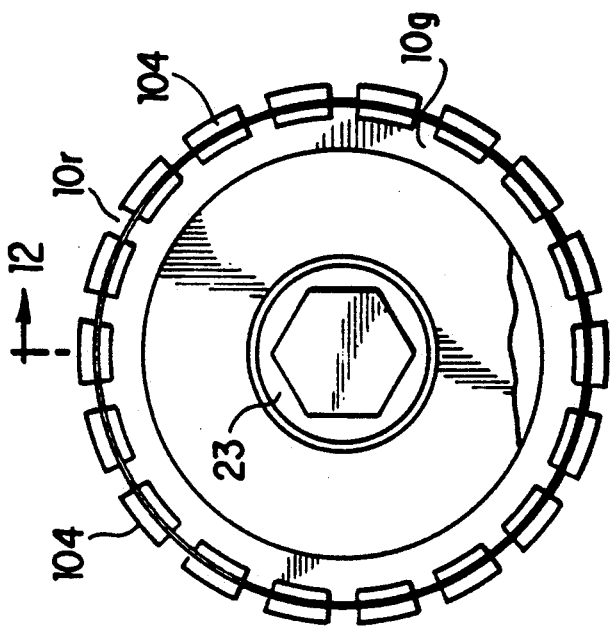
FIG. 12A is an end view of the roller assembly of FIG. 12.
Figure 12:
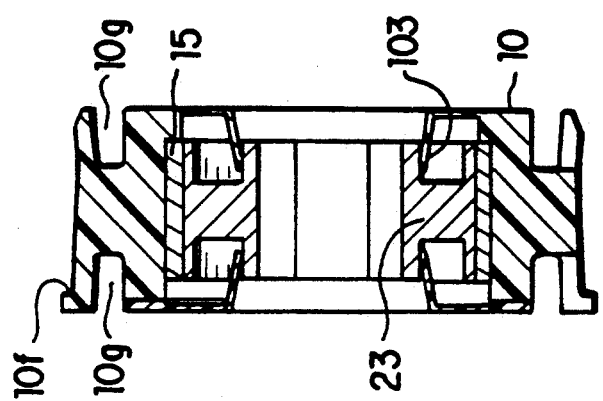
FIG. 12 is a cross-section of a roller assembly having a spring-like outer periphery.

An alternative housing construction is shown in FIGS. 12, 12A and 12B. These drawings show a complete roller assembly which includes a housing portion 10, a roller body 23 having a hex nut opening formed therein and, in accordance with another aspect of the present invention, a sleeve 15 formed of a hardened bearing material such as bearing steel is provided on the outer periphery of the roller body. The remainder of the roller body 23 may be formed of metal or plastic. In this case, the roller assembly is adapted to have the shaft extending through each end. Naturally, the housing configuration could also be used for a housing with one end closed such as that shown in FIG. 1A for example.

In order to provide a flexible outer periphery to the housing, in this embodiment, a facing groove 10g is formed on each end face of the housing 10 proximate the outer periphery of the housing. Additionally, as best shown in FIGS. 12A and 12B, circumferentially spaced radial slots 10r are formed along the edges of the outer periphery of the housing 10 at both ends of the housing. The facing grooves 10g and radial slots 10r, together define circumferentially spaced series of cantilever projections 104. Further, as best shown in FIGS. 12 and 12A, the outer periphery of the housing 10 has a slight taper upward as the housing approaches the axial ends. In this way, the outermost extent of the housing 10 is at the ends of the housing, i.e., the axial ends of the cantilever projections 104. Thus as viewed in FIG. 12, for example, the outer periphery has a slight "U" shape.

Taking all of the above into account, the housing 10 is formed such that the outer periphery is defined at its axial ends by the projections 104. These projections are spring mounted or flexibly mounted to the remainder of the housing such that the housing can be assembled into a tube or stationary support by pressing the housing into the tube, roll or stationary support such that the projections 104 are radially deflected downward to allow the housing to fit securely and snugly into the roll, tube or stationary support. Once inside the bore of the roll, tube or stationary support, the projections 104 spring upward to secure the housing in the support.

Again, it can be seen how by forming the housing in a special manner such that outer periphery is spring biased, the roller assembly is given a self-securing construction. This simplifies assembly of the roller assembly into a conveyor system or other application. As mentioned earlier, this savings in assembly time is greatly multiplied when the roller assembly is used in a conveyor system or some other application requiring hundreds of thousands of roller assemblies.

The roller assemblies of the present invention can be manufactured according to any suitable process. Generally, the manufacture would include the following sequence of steps. First, the necessary plastic pieces are molded and other non-plastic pieces, if used, are formed. Generally, the shape of the pieces, especially the housing, of the present invention allows molding using a simple two-piece or three-piece injection mold or in some cases, blow molding. After molding, the roller body and shaft assembly 20 is located within one housing portion 10A and the second housing portion 10B is fit around the assembly 20 so as to enclose the roller body 23. The housing portions 10A and 10B are then joined by sonic welding or an adhesive or some other suitable means to form a complete roller assembly. Lubricant is then inserted into the assembly through a pre-formed lubricating hole (such as that shown as 10L) or through a cannula inserted through the housing. After the necessary amount of lubricant is inserted the lubricant hole or the hole formed by the cannula is sealed or plugged to insure the fluid integrity of the roller assembly.

An important consideration in manufacturing the roller assemblies of the present invention is the shape and dimensions of the component parts. These dictate the mold types and molding techniques which can be used. Consequently, ease of molding is an important factor in designing a roller assembly according to the present invention. Other important factors are cost, intended use and required durability. With these factors in mind it is believed that there are numerous possible shapes and configurations of roller assemblies which embody the principles of the present invention as described above.

It should be appreciated that the present invention provides numerous advantages over conventional assemblies using rolling bearings. In particular, because of its all plastic lubricated construction, the present invention has a longer life, produces less noise and is less expensive than known roller assemblies. Moreover, because the present invention can be constructed entirely of non-corrosive parts, it is safe for use in sanitary environments such as food processing plants.

The present invention also provides numerous advantages over a dry all plastic system. Because of the provision of lubricant within the roller assembly, there is less noise, and the friction forces are reduced at least two and one half times so as to significantly reduce wear and extend the life of the roller assembly. Moreover, the present invention includes a molded in lip-type seal to prevent any possibility of leakage. The roller assembly can be formed with any engineering plastic. However, it is believed that DELRIN TM is particularly suitable for anticipated uses.

As noted earlier, the sealed roller construction described above is one of the starting points of the self-contained bearing units of the present invention. The other starting point is the conventional housed bearing units, particularly pillow block and flanged bearing units.

Figure 13:
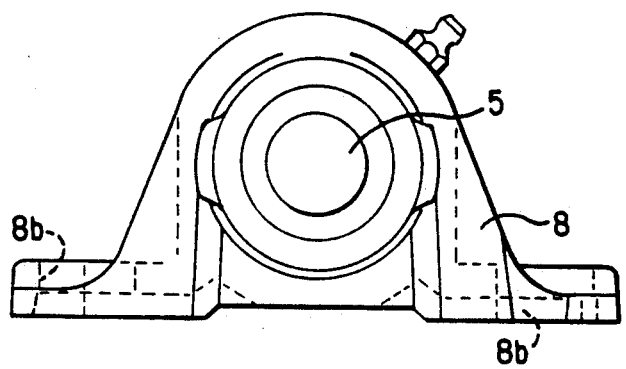
FIG. 13 is a front view of a conventional pillow block bearing unit.
Figure 13A:
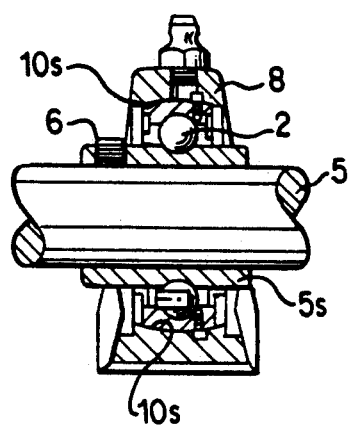
FIG. 13A is an axial cross-section of the pillow block bearing unit of FIG. 13.
Figure 13B:
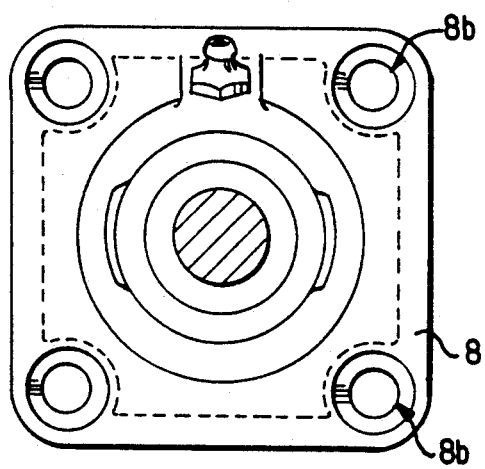
FIG. 13B is a front view of a conventional flanged bearing unit.
Figure 13C:
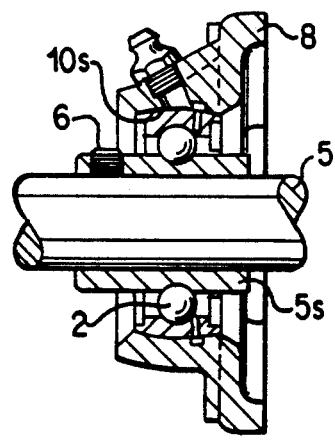
FIG. 13C is an axial cross-section of the flanged bearing unit of FIG. 13B.

FIGS. 13–13C illustrate conventional housed bearing units. In particular, FIGS. 13 and 13A illustrate a conventional pillow block bearing unit. As shown therein, the bearing unit includes an outer housing 8 having a plurality of bolt holes 8b for securing the housing 8 to another support. A shaft 5 is supported in a sleeve 5s which in this case also functions as the inner race of a ball bearing assembly. The ball bearing assembly includes a plurality of rolling elements, in this case balls 2, and an outer race. In this case, the outer surface 10s of the outer race is spherically curved to match the spherical curvature of the inner surface of the housing 8. In this way, the outer race and hence the entire bearing assembly can pivot about the spherical center of the surfaces. This allows shaft movement to adjust for misalignment and the like. To achieve quiet reliable performance, the inner and outer races are typically superfinished and very high quality (grade 10 or better) balls are used.

In accordance with the present invention, the roller assemblies described above may be adapted to provide a housed bearing assembly which offers advantages in comparison to conventional pillow block and flanged units. Several embodiments of this improved housed bearing assembly will be described hereinafter in connection with FIGS. 14–17. In describing the embodiments of FIGS. 14–17, the same number is used for parts which are similar in function to the parts of the roller assemblies discussed previously.

Figure 14:
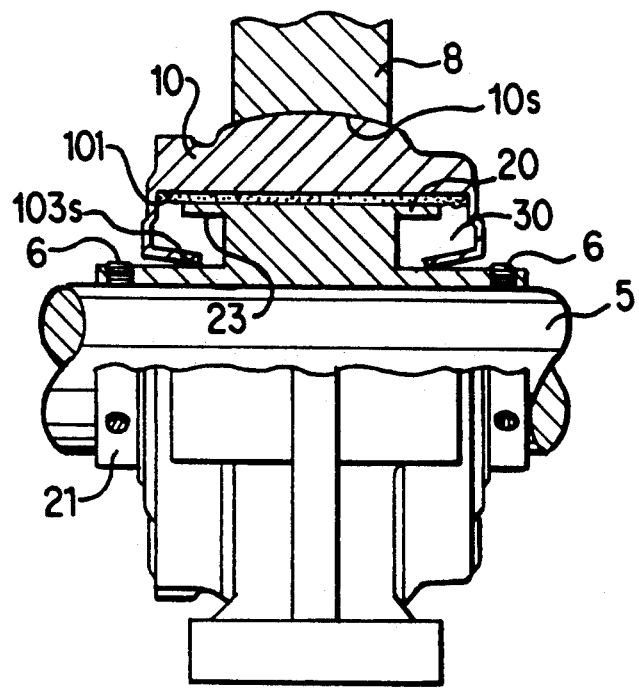
FIG. 14 is an axial cross-section of a first pillow block bearing assembly according to the present invention.

FIG. 14 shows a first pillow block bearing assembly according to the present invention. In the drawing, the upper half of the assembly is cut away so that the interior of the assembly can be seen. As shown therein, the assembly includes an outer housing 8 which is configured as a pillow block. The inner surface of the housing is formed as a spherical section. A bearing housing 10 is supported in the outer housing 8. The bearing housing 10 includes a spherical outer surface 10s which conforms to the spherical inner surface of the outer housing 8. In this way, the bearing housing 10 and the reminder of the bearing is provided with a self aligning capacity as is typical in pillow block bearing assemblies.

The radially inner surface of the housing 10 is formed as a cylindrical smooth peripheral wall or rolling surface 101. The axial ends of the housing 10 extend radially inward to define axial end walls as shown in FIG. 14. Each of the axial end walls is formed with a sleeve which ends in a sealing point 103s.

The assembly further includes a rolling body assembly 20 which includes a shaft sleeve 21 and a rolling body 23. The shaft sleeve 21 is adapted to be secured to a shaft 5 through any conventional means. In the illustrated embodiment, a nylon set screw 6 is provided for that purpose. The rolling body 23 is formed with a smooth cylindrical surface for rolling contact with the rolling surface 101 of the housing 10. As with the previously disclosed roller assembly embodiment, the housing 10, shaft sleeve and rolling body assembly 20 may be formed of either metal or plastic depending on the intended application. Preferably, however, at least one of these members is formed of a high performance engineering plastic for the reasons discussed above and to simplify manufacture by allowing easy molding. A supply of lubricant 30 is located within the housing 10.

In operation, the rolling body 23 rolls against the peripheral wall or rolling surface 101 of the housing 10. Typically, since the radially outermost dimension of the rolling body 23 is slightly less than the radially innermost dimension of the peripheral wall 101, this rolling contact occurs substantially along a single line. Depending on the configuration of the housing 10 and rolling body assembly 20 this line of contact typically occurs at or near the bottom or top of the assembly. In the embodiment illustrated in FIG. 14 the rolling contact will occur at the lower most region of contact along the bottom of the assembly. In fact, however, it is expected that there will be some contact along the entire surface. Moreover, as the rolling body 23 rotates it will tend to drag some lubricant with it as shown in FIG. 14.

The housing configuration and the provision of the seal points 103s ensure that leakage of lubricant will not occur. Specifically, as with the roller assemblies discussed previously, the housing is configured to include lubricant containment reservoirs at each axial end. In addition, the overall configuration guides lubricant away from the sealing point 103s. Lubricant will rarely, if ever, be located at the interface between the shaft sleeve 21 and the sealing point 103s. Should some lubricant happen to find its way to this interface, the light contact at the sealing point 103s will be sufficient to prevent leakage while the lubricant is quickly carried away from the interface.

Naturally, variations of the structure shown in FIG. 14 are possible. For example, the contact seal provided at the interface of the housing could be formed integrally with the rolling body assembly 20 if desired. If either the housing 10 or the rolling body assembly 20 is formed of plastic, it may be easier to form the contact seal integral with the plastic member instead of providing a separate seal in the housing. In addition, the specific housing configuration used to contain lubricant and direct lubricant away from openings in the housing and roller body could be modified as suggested elsewhere herein.

Figure 15:
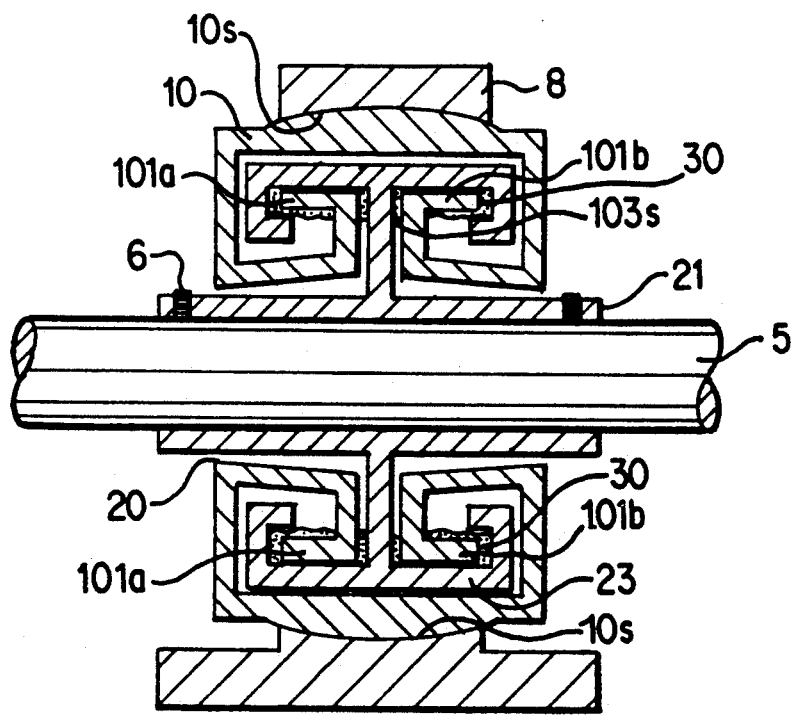
FIG. 15 is an axial cross-section of another pillow block bearing assembly according to the present invention.
Figure 16:
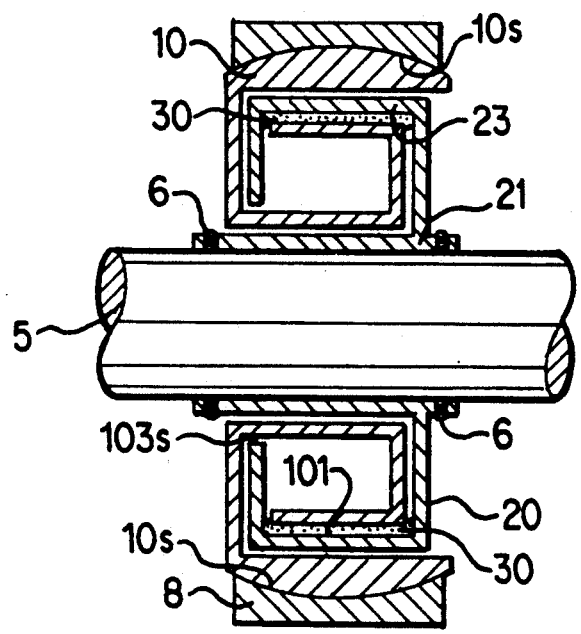
FIG. 16 is an axial cross-section of another pillow block bearing assembly according to the present invention.
Figure 17:
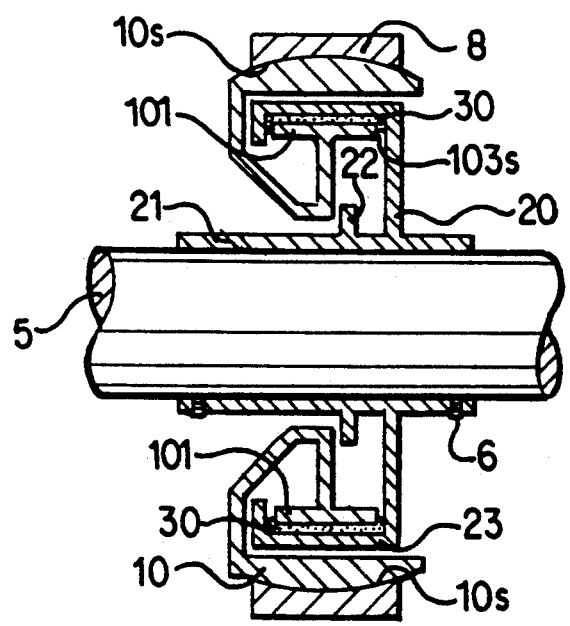
FIG. 17 is an axial cross-section of another pillow block bearing assembly according to the present invention.

In the embodiment shown in FIG. 14, the rolling surface of the rolling body 23 is located radially inward of the peripheral wall or rolling surface 101 of the housing. Since the rolling body 23 rotates, the radially inner surface moves while the radially outer surface is static. In some instances, this can present a problem with respect to ensuring that the lubricant 30 is distributed across the entire region of rolling contact. Specifically, although the rolling body 23 tends to drag some lubricant with it as it rotates, the centrifugal force of rotation tends to cause the lubricant to pull away from the surface of the rolling body 23. Thus, in some instances, it is desirable to provide an arrangement which will ensure distribution of lubricant 30 across the entire peripheral surface of contact. FIGS. 15-17 show various embodiments of such an assembly.

FIG. 15 shows an axial cross-section of a pillow block assembly similar to that shown in FIG. 14. Like the assembly of FIG. 14, this assembly includes an outer housing 8 and a bearing housing 10. Again, the bearing housing 10 is formed with a spherical outer surface which conforms to the inner surface of the housing 8 so as to allow self alignment of the bearing assembly. A rolling body and shaft sleeve assembly is also provided. In this embodiment, however, the assembly 20 and housing 10 are configured such that the rolling body 23-is located radially outward of the peripheral wall or rolling surface 101. In particular, the housing 10 is configured so as to wrap around the axial ends of the rolling body assembly 20 such that the peripheral wall or rolling surface is defined by two symmetrical cylindrical portions 101a and 101b. The rolling body 23 is in the form of an annular trough having radially inward extending axial ends which form an annular lubricant containment reservoir. Again, the overall configuration of the rolling body and housing is such that lubricant is guided into the fluid tight areas of the assembly and away from those regions where leakage might occur.

The shaft sleeve 21 is secured to the shaft 5 by a nylon set screw 6 or some other conventional form of attachment. The rolling body assembly 20 includes radially outward extending central portion which connects the rolling body 23 to the shaft sleeve 21. A supply of lubricant 30 is retained within the radially inner surface of the rolling body 23.

By virtue of the respective housing configurations and particularly the fact that the rolling body 23 is located radially outward of the peripheral walls or rolling surfaces 101a and 101b, the housing 10 and roller assembly 20 contact each other at the top of the assembly as shown in FIG. 15. Because of the slight difference in dimensions of these two members, there is typically a small space between the lower surface of the housing 10 and the lower surface of the rolling body 23. This is also shown in FIG. 15. When the shaft 5 rotates the roller body assembly 20 which is secured thereto rotates as well. The housing 10, on the other hand, remains substantially static. As such, the rolling body 23 rolls or rotates on the peripheral walls or rolling surfaces 101a and 101b. As a result of the rotation of the rolling body 23, the lubricant 30 retained therein is subject to a centrifugal force which distributes the lubricant 30 along the entire inner surface of the rolling body 23. In this way, the distribution of lubricant is ensured regardless of the point of contact of the housing 10 with the roller body 20.

Because the configuration of the rolling body 23 which is in the form of a lubricant containment reservoir and because of the fact that the oil is subjected to a centrifugal force there is little possibility of leakage of the oil. To ensure the complete integrity to prevent dust or other contaminants from entering into the interior of the assembly a contact seal or similar construction can be provided to provide a sealing point 103s when desired. The sealing point 103s can be provided by a separate contact seal or by integrally forming either the housing 10 or the rolling body assembly 20 with a light contact seal. Again, the seal contact should be sufficiently light so as to not interfere with rotation of the rolling body assembly 20 relative to the housing 10. This is made possible by virtue of the configuration of the housing and rolling body member which, as discussed elsewhere herein, ensures that lubricant will not be stored at the interface of the housing and rolling body for any significant period of time. Specifically, as is apparent from FIG. 15, the shape is such that lubricant is directed away from possible leakage points and toward fluid tight areas of the assembly.

As can be easily appreciated by reference to FIG. 15, the housing and rolling body member configurations are quite complex. In order to permit assembly of such complex configurations it is necessary to form these members as separate pieces and connect them in a sequence which permits overall assembly. The specific piece-configuration and assembly sequence can be selected to accommodate whatever molding or assembly techniques are preferred. Naturally, variations of the configuration depicted may be used, as suggested in the other embodiments disclosed herein.

FIG. 16 shows another pillow block assembly according to the present invention. Like the assemblies of FIGS. 14 and 15, this assembly includes an outer housing 8 and a bearing housing 10. The bearing housing is provided with a spherical outer surface 10s which conforms to the inner surface of the housing 8 to allow alignment of the bearing assembly. The housing 10 has a configuration by which a peripheral wall or rolling surface 101 is on a radially outer surface of the housing 10 spaced radially inward from another portion of the housing 10. Specifically, as shown in FIG. 16 the outer portion of the housing 10 includes an axial end wall which extends radially inward. This end wall is connected to a cylindrical radially innermost portion which extends axially and is connected to a radially outward extending end portion which supports the peripheral wall or rolling surface 101. The rolling body assembly 20 again includes a shaft sleeve 21 which is secured to the shaft 5 by a set screw 6 or the like. A wall extends radially outward from the shaft sleeve 21 to support the rolling body 23 which again is in the form of a cylindrical surface adapted to roll on the peripheral wall or rolling surface 101 of the housing 10. Another radially inward extending wall is provided at the opposite end of the rolling body 23 as shown in FIG. 16 so as to define an annular lubricant storage trough which wraps around the peripheral wall or rolling surface 101. A supply of lubricant 30 is contained within this trough. A sealing point 103S is provided between the radially inner end of the radially inward extending end wall of the roller body assembly 20. The sealing point 103 provides sealing with the radially innermost cylindrical wall of the housing 10. Again, the seal is an extremely light seal since by virtue of the shape of the housing 10 and roller body assembly 20 lubricant cannot remain at the interface of the sealing point 103S for a sustained period of time. Specifically, the assembly is configured such that lubricant is directed toward fluid tight containment reservoirs and away from possible leakage points, as shown in FIG. 16. Again, the specific housing configurations could be modified in light of the other disclosures herein so long as the principle of directing lubricant away from potential leakage points is maintained.

Like the embodiment of FIG. 15 and unlike the embodiment of 14, the rolling body 23 is located radially outward of the peripheral wall or rolling surface 101. Thus, contact between these two cylindrical surfaces will occur at the top of the assembly as shown in FIG. 16. A supply of lubricant wherever contact occurs is ensured by virtue of the fact that as the rolling body assembly 20 rotates with the shaft 5, the lubricant 30 is distributed across the entire cylindrical surface of the rolling body 23 as a result of centrifugal force.

As with the assembly of FIG. 15, the somewhat complex configuration of the housing 10 and rolling body assembly 20 will require multi part assembly. The specific nature of this multi part assembly depends on manufacturing convenience and the type of material used to form the respective parts. This assembly is, however, believed to be well within the capabilities of normal assembly techniques.

Another consideration with the embodiment of FIG. 16 is that the configuration and dimensions of the rolling body assembly 20 must be carefully designed so that the rolling body assembly 20 is dynamically stable. Specifically, assembly must be constructed so that the rotor is balanced and dynamic imbalances are minimized.

FIG. 17 shows another bearing assembly according to the present invention. This assembly again includes an outer housing 8 and a bearing housing 10. The bearing housing 10 is provided with a spherical outer surface 10s which, as shown in FIG. 17, conforms to the inner surface of the outer housing 8 to allow alignment of the bearing assembly. The housing 10 and rolling body assembly 20 are again configured such that the peripheral wall or rolling surface 101 of the housing is disposed radially inward of the rolling body 23. Once again, the rolling body 23 is in the form of annular trough which retains lubricant 30. Again, in operation, the rolling body assembly 20 rotates with the shaft 5 causing the lubricant 30 to be distributed along the entire surface of the rolling body 23 to ensure that the surfaces of the peripheral wall or rolling surface 101 and the rolling body 23 which are in contact are well lubricated. Again, the housing 10 and rolling body member 20 are configured such that lubricant is directed away from possible leakage points and retained within the assembly. Specifically, the housing 10 includes a conically tapered portion which directs any lubricant which should contact it back into the trough provided by the rolling body 23. It should be appreciated that by virtue of the centrifugal force which distributes the lubricant 30 along the rolling body 23 it is unlikely that any lubricant would migrate toward the central region of the assembly. It is, however, possible to provide a sealing point 103s at the interface between the housing 10 and the rolling body 20 to ensure the integrity of the housing configuration. The sealing point 103s may be provided by a contact seal formed integrally with or separate from either the housing 10 or the rolling body assembly 20 as discussed herein. The embodiment shown in FIG. 17 also includes the radially outward extending projection 22 formed on the shaft sleeve 21. The purpose of this outward projection is to prevent migration of any lubricant which may contact the shaft sleeve out of the assembly. Again, because the rolling body assembly rotates it is unlikely that lubricant will reach that point.

I claim:

1. A housed bearing assembly for supporting a rotating shaft, the assembly comprising:
   a shaft sleeve adapted to be secured to the rotating shaft for rotation therewith;
   a roller body secured to the shaft sleeve for rotation therewith, the roller body including a cylindrical wall portion;
   a housing, the housing comprising an outer housing portion and an inner housing portion, the outer housing portion having a radially innermost surface formed with a spherical seat, the inner housing having a radially outermost surface formed with a spherical segment which conforms to the spherical seat formed in the outer housing so that the inner housing is pivotably seated in the spherical seat formed in the outer housing;
   the inner housing further comprising a cylindrical peripheral wall portion disposed adjacent to the cylindrical wall portion of the roller body such that the roller body contacts the wall portion at a contact surface such that the roller body may roll on the cylindrical peripheral wall portion of the housing;
   a predetermined supply of lubricant contained within the housing; and
   a lubricant containment reservoir formed in at least one of the housing and the roller body the lubricant containment reservoir designed to contain lubricant such that lubricant is provided at the contact surface.

2. The bearing assembly of claim 1, wherein the cylindrical wall portion of the roller body is located radially outward of the cylindrical peripheral wall portion of the housing.

3. The bearing assembly of claim 1, wherein the cylindrical wall portion of the roller body is located radially inward of the cylindrical peripheral wall portion of the housing.

4. The bearing assembly of claim 1, wherein the roller body is in the form of an annular trough with the cylindrical wall portion of the roller body comprising the base of the trough and radially inward extending walls comprising the side edges of the trough such that on rotation of the roller body, lubricant contained within the trough is centrifugally distributed across the cylindrical wall portion of the roller body.

5. The bearing assembly of claim wherein a seal is provided on one of the housing and the roller body, the seal being in contact with the other of the housing and the roller body to seal the interior of the housing at a sealing point.

6. The bearing assembly of claim 5, wherein the lubricant containment reservoir is designed to contain lubricant such that regardless of the orientation of the assembly, lubricant does not collect at the sealing point.

7. A housed bearing assembly for supporting a rotating shaft, the bearing assembly comprising:
- a housing, the housing having a cylindrical interior surface portion and at least one shaft receiving opening formed therein, the housing further comprising a seal integrally formed with the housing;
- a shaft sleeve and roller body assembly comprising a roller body located within the housing and adapted to roll against the cylindrical interior surface portion of the housing and a shaft sleeve secured to the rotating shaft, the shaft sleeve extending into the housing through the shaft receiving opening and rotatably secured to the roller body, the seal being in sliding contact with the shaft sleeve and roller body assembly at a sealing point;
- a predetermined supply of lubricant contained within the housing; and
- a lubricant containment reservoir formed in at least one of the shaft and the housing, the lubricant containment reservoir designed to contain lubricant such that regardless of the orientation of the roller assembly, lubricant does not collect at the sealing point.

* * * * *